(No Model.)

J. DU SHANE.
SCHOOL RECORD BOOK.

No. 402,072.  Patented Apr. 23, 1889.

Fig. 1.

Fig. 2.

Witnesses.
Chas. W. Seville.
P. L. Brooks.

Inventor.
James Du Shane
By his Attorney J. M. Alexander

UNITED STATES PATENT OFFICE.

JAMES DU SHANE, OF SOUTH BEND, INDIANA.

SCHOOL-RECORD BOOK.

SPECIFICATION forming part of Letters Patent No. 402,072, dated April 23, 1889.

Application filed July 11, 1888. Serial No. 279,682. (No model.)

*To all whom it may concern:*

Be it known that I, JAMES DU SHANE, of South Bend, in the county of St. Joseph and State of Indiana, have invented certain new and useful Improvements in School-Record Books; and I do hereby declare that the following is a full, clear, and exact description thereof, reference being had to the accompanying drawings, and to the letters of reference marked thereon, which form part of this specification, in which—

Figure 1 represents a plan view of a book constructed according to my invention, showing the adjoining pages upon which the school-register is kept. Fig. 2 is a similar view showing the pages immediately succeeding, upon which the examination or scholarship record is kept.

This invention has for its objects to produce a record for schools by means of which an accurate register of the general standing of a pupil may be kept with as little trouble and labor as possible to the teacher, and which is so arranged that reference may be made to it readily and conveniently when required, as more fully hereinafter set forth.

The school-records in general use are usually kept in separate books, one of which furnishes a register of the pupil's attendance, absence, tardiness, and deportment, and the other a register of his attainments in his studies or his scholarship. This system of registry necessitates the frequent rewriting of the name of the pupil from page to page during the pupil's term, or the cutting away of portions of the leaves of the book, both of which methods are objectionable, one entailing unnecessary trouble and labor and the other resulting in the mutilation of the book, while neither method forms a complete record in one book of the scholastic term of the pupil.

My invention is designed to obviate these objections and furnish a book in which such a complete record can be kept in compact form and with such simplicity that it can readily be used for reference when required without the loss of time attending upon the use of separate books, and without rewriting the pupils' names. These objects I attain by the means illustrated in the accompanying drawings.

In constructing my improved book two sheets, A, are provided for the record of each pupil, and any number of these sheets may be bound together in such book, according to the number of pupils in the schools. The said sheets are of equal length, and on one side is printed or otherwise produced the proper heading and form for the school-register, and on the opposite side the heading-form for the examination-record. The sheets are then folded on the line *a*, so that each sheet will have one long and one short side. The said sheets are bound together in pairs at the line of folding, so as to form alternate leaves of different lengths having a margin on each of the longer leaves, which will be exposed when the shorter leaf is turned down upon it. This margin on the school-register side of the sheet contains the grade and name of the pupil, and on the examination-record side has spaces for remarks, as shown. It will be thus apparent that only one entry of the pupil's name is necessary for both the school and examination records, as when the short side of the sheet containing the initial page of the examination-record is turned over on the initial page of the school-record the form thereon folds in line with the exposed margin of the said school-record containing the name of the pupil, thus dispensing with material labor. By combining the two records in one book, besides reducing the labor in keeping the records and rendering the record more compact and easy of reference, it will be seen that the said records can be readily compared and the standing of the pupil as to attendance and as to scholarship may be taken in connection with each other, so as to form a ready estimate of the pupil's real abilities and determine between those who fail from want of proper capacity or from other legitimate reasons and those who fail from idleness and carelessness.

Having described my invention, I claim—

1. A record-book composed of a series of sheets having the school-register on one side and the examination-record on the other side, the sheets being folded in unequal lengths and bound at the folds, whereby alternate pages of different lengths are produced and the entry of the pupil's name on the school-register side of the sheet is seen when the examination-record is opened, substantially as described.

2. A record-book composed of a series of alternate long and short pages bound together, the adjoining faces of one long and one short page showing a school-record, and their opposite faces showing an examination-record, whereby, when the examination-record is opened, the name on the school-record on the preceding page will be disclosed, substantially as set forth.

3. A record-book composed of a series of alternate short and long sheets, A A, so bound that when the short sheet is turned down a margin on a preceding long sheet is disclosed, so that the record on the margin of the front sheet can be read with both sides of the short sheet, substantially as specified.

In testimony that I claim the foregoing as my own I affix my signature in presence of two witnesses.

JAMES DU SHANE.

Witnesses:
JENNIE ANDERSON,
W. G. CRABILL.